United States Patent Office 3,634,372
Patented Jan. 11, 1972

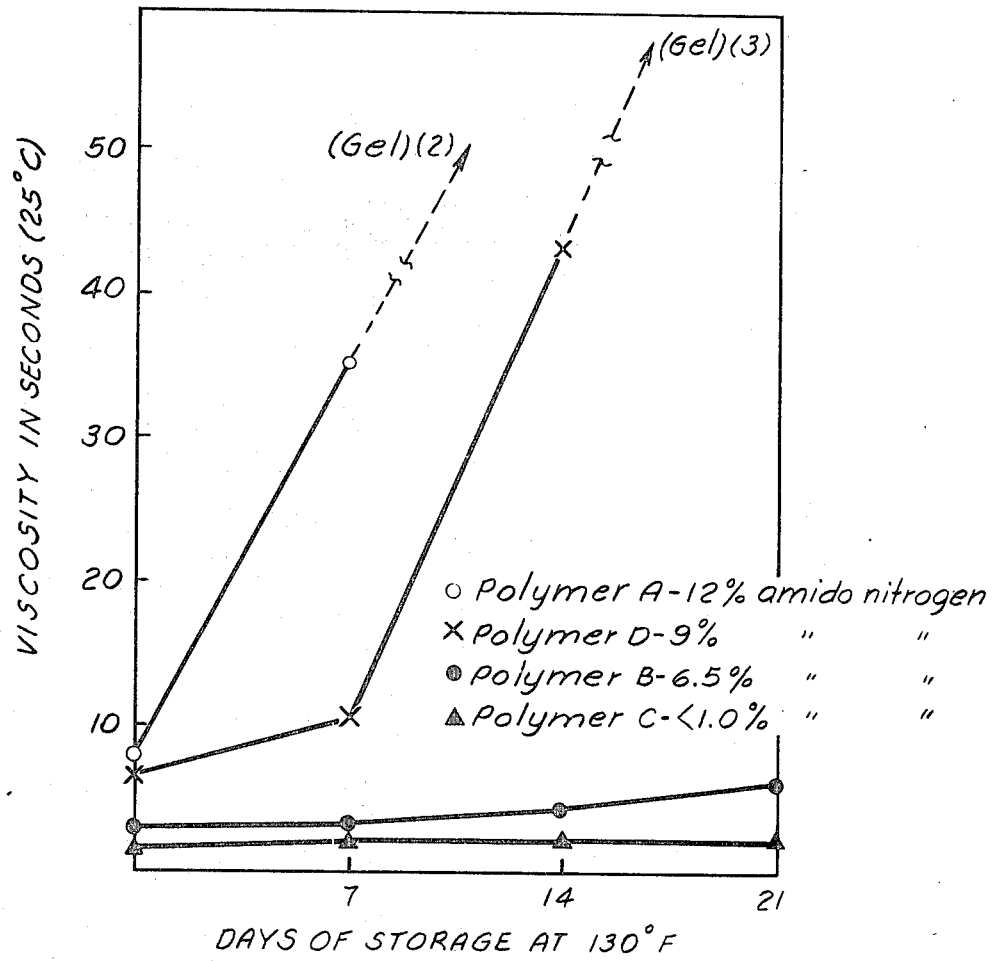

3,634,372
VINYL INTERPOLYMER COMPOSITIONS CONTAINING PENDANT POLYAMINE GROUPS
Russell T. McFadden, Freeport, Tex., assignor to The Dow Chemical Company, Midland, Mich.
Continuation-in-part of application Ser. No. 651,560, July 6, 1967. This application July 10, 1969, Ser. No. 840,795
Int. Cl. C08f 27/08
U.S. Cl. 260—86.1 N
14 Claims

ABSTRACT OF THE DISCLOSURE

Vinyl interpolymers with improved stability in solution and of particular use in adhesives and coatings are prepared by reacting an alkylenimine or an N-(aminoalkyl) alkylenimine with a copolymer containing pendant carboxylic acid groups. The improved stability of the vinyl interpolymer solutions is related to conducting the above reaction at a temperature between about 50° and 100° C.

CROSS REFERENCES

This application is a continuation-in-part of my co-pending application, Ser. No. 651,560, filed on July 6, 1967, and now abandoned.

BACKGROUND OF THE INVENTION

This invention relates to vinyl interpolymer compositions containing pendant polyamine groups wherein said interpolymers have improved stability in solution against gellation and are particularly useful in adhesives and coatings.

The utility of an amine group to provide improved adhesion of polymeric materials to a variety of substrates is well known. The principal difficulty in the past has been to find economical means to incorporate the amine group into polymeric materials either synthetic or natural. One proposed approach utilizes the reactivity of ethylenimine and other alkylenimines or alkylenimine derivatives with a carboxylic acid group, such as in U.S. 3,228,823 and Belgium 636,350. However, products prepared according to these patents gel in a relatively short period of time.

SUMMARY OF THE INVENTION

Accordingly, this invention provides for novel vinyl interpolymers having pendant polyamine groups wherein said interpolymer has improved stability in solution against gellation. The pendant polyamine group may be represented by the formula

wherein $R_1$ and $R_2$ are independently selected from the group consisting of hydrogen and alkyl radicals of 1 to 4 carbon atoms and the average value of $n$ ranges from about 1.5 to about 2.5. The vinyl interpolymer is preferably produced and employed as a solution.

The compositions of this invention are generally prepared by first preparing a vinyl carboxylic acid interpolymer and then reacting the carboxylic acid groups of the interpolymer with at least one mole of an N-(aminoalkyl) substituted alkylenimine or about 2 to 5 moles of an alkylenimine per equivalent of carboxylic acid at a temperature of about 50° C. to 100° C.

The reason for the improved stability of the vinyl interpolymers of this invention is not known but it appears to be related to the residual carboxylic acid content and/or the percent of the total nitrogen content which is present as amido nitrogen, both of which are related to the method by which the imine is reacted with the vinyl carboxylic acid interpolymer.

DRAWINGS

The drawing illustrates by graphical means the relationship of stability to the percent amido nitrogen of the vinyl interpolymer.

DETAILED DESCRIPTION OF THE INVENTION

Polymerized vinyl interpolymers containing carboxylic acid groups are generally prepared from a solution of a mixture of monomers, one of which is a vinyl carboxylic acid monomer. The monomer mixture is polymerized in the presence of a catalyst and usually under controlled elevated temperatures with agitation until the polymerization reaction is complete. Various modifications commonly practiced with solution polymerization reactions can be utilized, modifications such as stepwise addition of the monomer mixture during the polymerization, incremental addition of catalyst, polymerization under an inert atmosphere, continuous or batch polymerization and the like. The details of such polymerization are well known and need not be discussed further herein.

The vinyl carboxylic acid monomers include the $\alpha,\beta$-ethylenically unsaturated monocarboxylic acids such as acrylic, methacrylic, cinnamic, crotonic acids and the like; unsaturated dicarboxylic acids such as maleic, fumaric, itaconic acids and the like; half esters of the unsaturated dicarboxylic acids cited above, and mixtures thereof. Preferably the vinyl carboxylic acids are unsaturated monocarboxylic acids and most preferred are acrylic and methacrylic acid.

The vinyl interpolymer is prepared by copolymerizing a vinyl carboxylic acid with one or more copolymerizable monomers such as vinyl aromatic monomers, alkyl esters of unsaturated monocarboxylic acids, dialkyl esters of unsaturated dicarboxylic acids, vinyl and vinylidene chloride and fluoride, N-vinyl pyrrolidone and the like.

Suitable vinyl aromatic monomers include styrene, $\alpha$-methylstyrene, vinyl toluene, the various alkyl substituted styrenes, the various halo substituted styrenes, vinyl naphthalene and the like. The more preferred of these monomers are styrene, $\alpha$-methylstyrene and vinyl toluene. Suitable alkyl esters of unsaturated mono- and dicarboxylic acids include the esters prepared from aliphatic alcohols containing from 1 to 12 carbon atoms and from cyclohexyl alcohol with the vinyl carboxylic acids cited previously. The acrylic and methacrylic esters are preferred; most preferred of these monomers are methyl, ethyl, isopropyl, butyl and 2-ethylhexyl acrylates or methacrylates. Small amounts of acrylonitrile, less than about 10 percent, may also be used to improve the film properties.

The vinyl interpolymers are preferably prepared with a sufficient amount of a vinyl carboxylic acid monomer to provide from about 1 to about 20 percent by weight of carboxylic acid (as —COOH) and the balance of said interpolymer is comprised of one or more of the copolymerizable monomers. Preferably the carboxylic acid content ranges from about 3 to 12 weight percent. Mixtures of vinyl aromatic monomers and alkyl esters of vinyl carboxylic acids may be advantageously used.

Suitable solvents for the polymerization include alcohols, ketones, aromatic hydrocarbons and the like or mixtures thereof. The polymerization temperature may range from 60° to 140° C., with a preferred range of 80° to 100° C. The particular temperature is variable depending on the monomers, the catalyst and other conditions.

The compositions of this invention are prepared by an amination reaction in which the vinyl carboxylic acid interpolymer in a suitable solvent is reacted with an excess of alkylenimine or an N-((aminoalkyl) substituted alkylenimine. Suitable alkylenimines include the 1,2-alkylenimines such as ethylenimine, propylenimine, butylenimine and the like and mixtures thereof. Ethylenimine is readily available in commercial quantities and is preferred. Particularly useful are the N-(aminoalkyl) substituted alkylenimines since they react similarly to the alkylenimines with a carboxylic acid group but are less volatile than the alkylenimines. Exemplary of these compounds are N-(2-aminoethyl) aziridine, N-(3-aminopropyl) aziridine, N-(2-aminopropyl) propylenimine, N-(2-aminobutyl) butylenimine and the like. Particularly preferred are N-(2-aminoethyl) aziridine and N-(2-aminopropyl) propylenimine.

To obtain a plurality of amine groups per carboxylic acid group, at least 2 moles of an alkylenimine per equivalent of carboxylic acid are reacted with the organic solvent solution of the vinyl carboxylic acid interpolymer in order to obtain an average $n$ value, according to the formula, of at least 1.5. Preferably, the number of moles of alkylenimine ranges from about 2 to about 5 giving an average $n$ value of about 1.5 to 2.5. With the N-(aminoalkyl) alkylenimine, at least one mole, and preferably 1 to 1.5 moles, per equivalent of carboxylic acid is used.

The temperature of the amination reaction is best conducted above about 50° C. and preferably from about 50 to 100° C., although higher temperatures and superatmospheric pressures may be used. In contrast to these temperature conditions the art suggests adding the imine at room temperature and keeping the temperature thereat for a period of time before heating the reaction mixture. The products produced thereby differ substantially in stability to the products of this invention and differ measurably in their amido nitrogen or unreacted acid content.

The reaction of the alkylenimine or the N-(aminoalkyl) alkylenimine with the carboxylic acid group is favored by non-protic solvents such as ketones and aromatic hydrocarbons such as methyl ethyl ketone, xylene, toluene, ethylbenzene and the like. A portion of the non-protic solvent may be replaced by an alcohol. Suitable alcohols include aliphatic alcohols containing from 2 to 5 carbon atoms, lower alkyl monoethers of ethylene and propylene glycols, diacetone alcohol and the like.

Preferably, the amination reaction is run in a solvent containing less than 20 percent by weight alcohol with the balance of the solvent comprising aromatic hydrocarbon solvents. After completion of the amination reaction, the solvent composition may be adjusted to comprise from 30 to 60 percent by weight of an alcohol solvent and from 70 to 40 percent by weight of a non-protic solvent, preferably an aromatic hydrocarbon. Particularly preferred solvents include xylene, toluene, isopropyl alcohol, isobutyl alcohol, n-butyl alcohol and the monomethyl ether of propylene glycol. The final product may have a polymer concentration from 1 to 60 percent by weight depending on the polymer solubility and the particular application.

The mechanism by which the improved stability is obtained is not clearly understood although it has been determined that the stability is at least in part related to the percentage of total nitrogen in the polymer which is present as amido nitrogen. As shown in the drawing, increased stability is obtained as the percentage of amido nitrogen decreases. Generally, it is preferred to maintain the percent amido nitrogen below about 9–10%.

Residual carboxylic acid content (as —COOH) of the aminated interpolymer also appears to be related to the ultimate stability of the product. It is desirable to maintain the residual acid content below about 0.25 weight percent (polymer basis) and preferably below about 0.15 weight percent.

While it is believed that the amido nitrogen content and the residual acid content of the aminated interpolymer are related to the stability of said interpolymer in solution this invention should not be limited or held to such belief. Whatever the factors the fact remains that aminated interpolymers prepared at the higher temperatures of this invention are demonstrably and significantly more stable in solution than interpolymers prepared at lower temperatuers according to the art procedures.

To illustrate this invention, the following non-limiting examples are provided. All percentages and parts in the examples are by weight unless otherwise specified.

As previously described, the percent amido nitrogen it is meant to include the percent of the total nitrogen added by the amination reaction with the vinyl interpolymer which is present as amido nitrogen.

In the examples the following definitions and analytical methods were used:

Percent resin solids

Approximately 1 gm. of polymer solution is accurately weighed into a tared aluminum weighing pan and then heated at 150° C. until the pan and contents reach a constant weight.

$$\text{Percent Resin Solids} = \frac{\text{wt. of resinous residue}}{\text{wt. of solution}} \times 100$$

Viscosity (25° C.) Gardner

The polymer solution is poured into a Class V 10.75 mm. I.D., R.P.C. viscosity tube until the meniscus is level with the lower calibration. A cork is inserted to the upper calibration and the tube is inverted in a 25° C. chamber. After 40 minutes the tube is quickly inverted and the time required (average of three determinations) for the bubble to touch the cork is measured.

Amine equivalent weight

A 4–5 gm. sample of solution is weighed into a polyethylene beaker and dissolved in 50 ml. of isopropanol. The solution is then titrated potentiometrically with 1.0 N HCl. The amine equivalent weight is $$\frac{(\text{Wt. of sample}) \times (\% \text{ Resin Solids})}{(\text{Meq. of } 1.0 \text{ N HCl to end point})} \times 1000$$

Amine hydrogen equivalent weight

A weighed sample of polymer solution is reacted with an excess of phenyl glycidyl ether (PGE) as a 5% solution in glycol monoethyl ether by refluxing for one hour. To the hot solution is added an aliquot of hydrochlorination reagent (35 ml. conc. HCl, 250 ml. of pyridine and 750 ml. of glycol monoethyl ether) and the mixture is refluxed for 40 minutes more. After cooling the remaining pyridinium chloride is titrated with 0.2 N KOH in ethanol to a cresol red endpoint. The amine hydrogen equivalent weight is given by $$\frac{(\text{Wt. of sample}) \times (\text{Percent Resin Solids}) \times 1000}{(\text{Meq. of KOH}) + (\text{Meq. of PGE})}$$
$$- (\text{Meq. of Hydrochlorinating Reagent})$$

Amido nitrogen

Primary and secondary amido nitrogen were determined by measuring the infrared absorbance of 0.05 mm. films cast on a KBr plate at 1680 cm.$^{-1}$ and 1580 cm.$^{-1}$ and comparing to spectra of pure model compounds. Spectra were obtained on a Beckman IR-9 Infrared Spectrophotometer and results reported as weight percent

Molecular weight

The polymer molecular weight was determined by analysis of a polymer sample in tetrahydrofuran on a Waters Gel Permeation Chromatograph. Values are weight average molecular weights.

EXAMPLE 1

To illustrate the effect of temperature on the amination reaction and the subsequent stability of the aminated vinyl interpolymer as related to the amido nitrogen content a series of polymers were made as follows:

Vinyl interpolymer

To a five-liter glass vessel equipped for stirring, refluxing, continuous reactant addition, gas sparging, temperature control, etc. were charged 1215 gms. of toluene, 135 gms. of isopropanol and 135 gms. of isobutanol. While stirring the solvent mixture was heated to reflux (93° C.) to expel oxygen. After cooling to 90° C. addition was started of a monomer mixture consisting of 844 gms. butyl acrylate, 452 gms. methyl methacrylate, 162 gms. methacrylic acid and 13 gms. azobisisobutylronitrile. The addition was completed in 165 minutes at a temperature of 90–95° C. The polymerization was completed by heating at 90–98° C. for 18 hours. The cooled polymer solution had a viscosity of 7 seconds, a —COOH content of 2.81%, a resin solids content of 48.3%, a percent nitrogen content of <0.02% and a molecular weight of 20,000. (600 A. chain length).

Polymer A

Following the teaching of Belgium 636,350 a 400 gm. sample of the previously prepared vinyl interpolymer solution representing about 0.25 equivalents of carboxylic acid was charged to a 1 liter reactor. With stirring a solution of 21.5 gms. of ethylenimine in 30.7 gms. of toluene was added over a 13 minute period. The temperature rose spontaneously from 28° C. to 35° C. After one hour of stirring at 30–35° C. the mixture was heated to 70° C. and held thereat for 5 hours. The properties and stability data are shown in Table I and in the graph.

Polymer B

Another polymer was prepared according to this invention in a manner similar to Polymer A except that pure ethylenimine was added over a 15 minute period to the polymer solution preheated to 82° C. The temperature rose to 89° C. and the temperature was maintained at 85–90° C. for four hours and then cooled to 25° C. The resin solids content was 50.2%, molecular weight 20,000 and residual ethylenimine content was 0.65%. At atmospheric pressure 87 gms. of liquid was distilled off and the solution divided into two 160 gm. portions. One portion was diluted with 40 gms. of toluene and the other with 40 gms. of isopropanol. The properties and stability data are shown in Table I and in the graph.

Polymer C

In a manner similar to that for Polymer B, propylenimine was reacted with the previously prepared vinyl interpolymer. An equivalent amount of propylenimine (28.5 gms.) was added over a 40 minute period. Liquid was distilled and the polymer solution was divided and diluted as for Polymer B. The properties and stability data are shown in Table I and in the graph.

EXAMPLE 2

In a manner similar to that of Example 1, a vinyl interpolymer was prepared by polymerizing a monomer mixture of 130 gms. butyl acrylate, 70 gms. of methyl methacrylate, 25 gms. of methacrylic acid and 2.1 gms. of catalyst in a solvent of —210 gms. of xylene, 20 gms. of isobutanol and 20 gms. of isopropanol. The polymer solution contained 47.2% solids, 2.66% —COOH and the polymer had a molecular weight of 20,000 (600 A. chain-length).

Polymer D

The above carboxylated polymer was reacted with ethylenimine as before except the polymer solution was heated to 60° C. and 25 gms. of ethylenimine was added over a 45 minute period while maintaining the temperature at 60–65° C. The mixture was then heated for three additional hours at 70° C. The solution was then heated to distill off 30 gms. of liquid and after cooling 30 gms. of isopropanol added. The properties and stability data are shown in Table I and in the graph.

EXAMPLE 3

In a manner similar to that of the previous examples, a polymer was prepared from a monomer mixture comprising 940 gms. butyl methacrylate, 120 gms. methacrylic acid and 10 gms. of azobisisobutyronitrile and a solvent comprising 600 gms. of xylene, 100 gms. of isopropyl alcohol and 500 gms. of isobutyl alcohol. The polymerization was carried out overnight at 90° C. Then 140 gms. of N-(3-aminopropyl) aziridine were added over a one hour period and the reaction continued for three hours at 90° C. and four hours at 100° C. The final product had a solids content of 49.7 percent, an amine equivalent weight of 452 and a Gardner-Holt viscosity of 46.6 seconds at 25° C. The viscosity, after four weeks of storage at 130° F., had only increased to 55 seconds.

EXAMPLES 4–8

To further illustrate the interpolymer compositions of this invention, a series of polymers was prepared according to the procedure of the previous examples. In all cases, the vinyl carboxylic acid used was methacrylic acid and the amination reaction used ethylenimine in an amount equal to the weight of methacrylic acid (about 2 moles of ethylenimine/equivalent of carboxylic acid). Catalytic amounts of azobisisobutyronitrile were utilized in all the polymerizations. AEW stands for amine equivalent weight.

EXAMPLE 4

Monomers:

| | Grams |
|---|---|
| Methacrylic acid | 50 |
| Methyl methacrylate | 140 |
| Ethyl acrylate | 200 |

Solvent:

| | |
|---|---|
| Toluene | 300 |
| Methyl ethyl ketone (MEK) | 300 |
| Isopropyl alcohol | 300 |

TABLE I.—PROPERTIES OF AMINATED POLYMERS A–D (EXAMPLES 1 AND 2)

| Polymer | Percent resin solids | Amine eq. wt.[1] | Amine H eq. wt.[1] | Polymer nitrogen content, percent[2] | | | Amido nitrogen, percent | Viscosity at 25° C. after storage at 130° F., sec. | | | |
|---|---|---|---|---|---|---|---|---|---|---|---|
| | | | | Total | As amine | As amide | | Initial | After 1 wk. | After 2 wks. | After 3 wks. |
| A | 44.8 | 462 | 324 | 3.28 | 2.88 | 0.40 | 12.2 | 8.0 | 35 | [3] Gel | |
| B(T)[4] | 48.5 | 539 | 369 | 2.78 | 2.60 | 0.18 | 6.5 | 3.0 | 3.4 | 4.5 | 6.3 |
| B(P)[4] | 49.1 | 527 | 363 | 2.82 | 2.65 | 0.17 | 6.0 | 3.8 | 4.2 | 5.3 | 8.4 |
| C(T)[4] | 46.6 | 646 | 615 | 2.17 | 2.14 | <0.03 | <1 | 1.9 | 2.0 | 2.2 | 2.2 |
| C(P)[4] | 47.2 | 653 | 590 | 2.10 | 2.07 | 0.03 | 1.4 | 2.5 | 2.5 | 2.8 | 2.7 |
| D | 48.9 | 464 | 331 | 3.32 | 3.02 | 0.30 | 9.0 | 6.5 | 10.8 | 43 | Gel |

[1] Resin solids basis.
[2] Resin solids basis and corrected for residual alkylenimine.
[3] 10th day.
[4] Diluted with toluene (T) or isopropanol (P).

EXAMPLE 5

Monomers:

| | Grams |
|---|---|
| Methacrylic acid | 195 |
| Styrene | 520 |
| Butyl acrylate | 585 |

Solvent:

| | |
|---|---|
| Toluene | 780 |
| MEK | 390 |
| Isopropyl alcohol | 390 |

AEW: 354

EXAMPLE 6

Monomers:

| | Grams |
|---|---|
| Methacrylic acid | 100 |
| Butyl methacrylate | 150 |
| Styrene | 250 |

Solvent:

| | |
|---|---|
| Toluene | 250 |
| MEK | 250 |
| Ethyl alcohol | 100 |

AEW: 300

EXAMPLE 7

Monomers:

| | Grams |
|---|---|
| Methacrylic acid | 100 |
| Styrene | 250 |
| Butyl acrylate | 150 |

Solvent:

| | |
|---|---|
| MEK | 250 |
| Isopropyl alcohol | 50 |
| Xylene | 250 |
| Isobutyl alcohol | 50 |

AEW: 305

EXAMPLE 8

Monomers:

| | Grams |
|---|---|
| Methacrylic acid | 80 |
| Styrene | 120 |
| Cyclohexyl acrylate | 120 |

Solvent:

| | |
|---|---|
| Toluene | 200 |
| MEK | 200 |
| Ethyl alcohol | 80 |

EXAMPLE 9

A vinyl carboxylic acid interpolymer similar to that of Example 1 was prepared in several different solvents and the weight of polymer solids determined. Then 2 moles of ethylenimine per equivalent of carboxylic acid were added and reacted as described. The percent gain in weight was a measure of the degree of reaction with the interpolymer. A summary of the results is shown in Table II.

The effect of non-protic solvents on the amination reaction is clearly shown. However, after completion of the reaction, it has been found to be of advantage from the stability of the solution to replace part of the non-protic solvent with an alcohol solvent. From this standpoint, final solvent compositions comprising from 30 to 60 percent alcohol are preferred.

This invention, in addition to providing compositions suitable for coating purposes utilizing an organic solvent, also provides for air-drying water-soluble coatings.

EXAMPLE 10

In a 5 liter flask equipped for mechanical stirring, refluxing, temperature control, inert gas purging, etc. were charged 1500 gms. of monomethyl ether of propylene glycol which was heated and purged with methane to expel dissolved oxygen. After purging, the solvent temperature was adjusted to 80°–85° C. and the following monomer mixture added: 400 gms. butyl acrylate, 400 gms. methyl methacrylate, 100 gms. methacrylic acid and 9 gms. azobisisobutyronitrile. The monomer feed rate was adjusted so that the addition was completed in 90–120 minutes. The contents were cooled to maintain the temperature below 85° C. during the monomer addition and were then polymerized overnight at 80°–85° C. (about 18 hours).

Then, 110 gms. of N-(2-aminoethyl) aziridine were added dropwise over about a 40 minute period to the polymer solution maintained at 80° C. After addition of the aziridine, the mixture was heated at 80° C. for two hours and then at 90°–95° C. for one hour. The product had a solids content of 39.6 percent and the amine equivalent weight of the polymer was 406.

After cooling, 180 gms. of glacial acetic acid were added dropwise and then 500 gms. of distilled water. After thorough mixing, the polymer solution was pale yellow in color and clear, had a viscosity of 10–10.5 seconds (Gardner-Holt tube), had a percent N of 1.13 percent and a solids content of 32.9 percent.

EXAMPLE 11

Another polymer composition was prepared as in Example 10, except that 110 gms. of ethylenimine were used in place of N-(2-aminoethyl) aziridine. After the amination reaction, about 300 gms. of solvent were distilled to remove unreacted ethylenimine and replaced with 300 gms. of fresh solvent.

The final product was a clear, pale yellow solution with a viscosity of 9–9.5 seconds, a percent N of 0.9 percent and a solids content of 31.2 percent.

EXAMPLE 12

Another composition was prepared as in Example 10, except that 128 gms. of N-(3-aminopropyl) aziridine were used in place of the 110 gms. of N-(2-aminoethyl) aziridine. The final product was a clear, pale yellow solution with a viscosity of 10.5–11 seconds, a percent N of 1.05 percent and a solids content of 33.4 percent.

EXAMPLE 13

The compositions of Examples 10–12 are dilutable with water to give clear, bright solutions with no trace of turbidity or precipitation. Coatings were prepared from these compositions by diluting 200 gms. of each solution with 200 gms. of distilled water and casting films about 2 mils thick on steel panels. The films were allowed to air-dry at 25° C., 50 percent relative humidity for 48 hours, one week and two weeks. The films were then tested for sensitivity to water and 5 percent caustic soda with the results in Table III.

TABLE II.—EFFECT OF SOLVENT

| | Solvent composition in percent | Percent solids before addition of ethylenimine | Percent solids after | Percent of theoretical weight gain |
|---|---|---|---|---|
| Ex. 12a | 92 isobutyl alcohol / 8 isopropyl alcohol | 47.1 | 48.0 | 33.3 |
| Ex. 12b | 58 xylene / 25 MEK / 17 isobutyl alcohol | 46.7 | 49.5 | 104 |
| Ex. 12c | 83 xylene / 8.5 isobutyl alcohol / 8.5 isopropyl alcohol | 47.1 | 49.5 | 93.1 |

TABLE III.—FILM RESISTANCE

| | Distilled water test | | | 5 percent caustic soda test | | |
|---|---|---|---|---|---|---|
| | 48 hrs. | 1 week | 2 weeks | 48 hrs. | 1 week | 2 weeks |
| Example 10 | M | S | No | S | V-S | No. |
| Example 11 | M | S | No | S | V-S | No. |
| Example 12 | M | S | No | S | V-S | No. |
| Unaminated polymer of Example 10 | S | V-S | No | Dissolved | Dissolved | Severe break-up. |

The tests were made by placing a drop of the test liquid on the coating and observing the result after 5 minutes.

TABLE IV.—EFFECT OF RESIDUAL ACID CONTENT

| Run No. | Reaction temp., °C. | Moles of EI per COOH, charged | Average n value [1] | Residual —COOH, percent | Total N, percent | Amido nitrogen, percent | Viscosity at 25° C. after storage at 130° F., cps. | | | | |
|---|---|---|---|---|---|---|---|---|---|---|---|
| | | | | | | | 0 | 1 week | 2 weeks | 3 weeks | 4 weeks |
| A | ½ hr. at 25°, 3 hrs. at 60°. | 1.28 | 1.26 | 0.99 | 2.23 | <.05 | 6,000 | Gelled | | | |
| B | 80° | 1.28 | 1.17 | 0.74 | 2.22 | <.05 | 14,000 | do | | | |
| C | 80° | 1.50 | 1.28 | 0.45 | 2.51 | <.05 | 1,600 | do | | | |
| D | 80° | 1.75 | 1.31 | 0.28 | 2.56 | <.05 | 500 | 1,580 | Gelled | | |
| E | 80° | 2.0 | 1.49 | 0.11 | 3.04 | <.05 | 220 | 480 | 760 | 3,000 | Gelled |
| F | 80° | 3.0 | 1.86 | 0.10 | 3.87 | <.05 | 200 | 260 | 255 | 550 | 850 |
| G | 80° | 5.0 | 2.09 | 0.13 | 4.31 | <.05 | 170 | 200 | 210 | 340 | 470 |

[1] Average moles of EI reacted per—COOH group corrected for residual unreacted—COOH.

M=moderate whitening, S=slight whitening, V-S=very slight whitening and No=no whitening.

All the coatings of Examples 10–12 had a pencil hardness of 2H–3H and withstood an impact of 30 inch pounds and a conical mandrel bend of ⅛ inch.

EXAMPLE 14

The effect of residual carboxylic acid content on stability was compared to a polymer prepared according to U.S. 3,228,823 in the following experiments.

A methacrylic acid-acrylic ester interpolymer was prepared by mixing together in a five-liter glass reactor 1215 gms. of toluene, 135 gms. of i-propanol, and 135 gms. of i-butanol and heating the mixture at reflux (90° C.) for 15 minutes. The solvents were then cooled to 80° C. and to them was added, with good stirring, the following mixture: butyl acrylate, 884 gms.; methyl methacrylate, 452 gms.; methacrylic acid, 162 gms.; and azobis(isobutyronitrile), 13.0 gms. The addition was completed in 100 minutes, and after three hours and 20 minutes more the solution was cooled and bottled. It had the following properties: 49.0% resin solids; 2.86% CO$_2$H; 2700 cps. viscosity; and clear, colorless appearance.

It was divided into 400 gm. portions and reacted with ethylenimine according to the reaction conditions shown in Table IV. Then 100 gms. of fresh toluene was added and 100 gms. of liquid was distilled out of the reactor to remove unreacted ethylenimine. The resin solution was then cooled and bottled.

For comparison purposes one amination run was made according to Example 1 of U.S. 3,228,823 in which the ethylenimine (EI) was added to the cold polymer solution and after mixing for 30 minutes at ambient temperature was subsequently heated to 60° C.

It can be seen from the results in Table IV that even with a low amido nitrogen content those polymers with a residual acid content above about 0.25% are relatively unstable. The high acid content and instability of the comparison run, A, is noteworthy.

The previous examples have shown the improved and unexpected stability of the aminated interpolymers obtained by reacting the alkylenimine with the carboxylic interpolymer at a temperature of about 50° C. to 100° C. The polymers prepared according to the known art show rapid gellation in solution.

The compositions of this invention have a variety of uses wherein the pendant polyamine functionality can be utilized to advantage. In the form of solutions of the aminated vinyl interpolymer, the compositions are useful to form coatings on a variety of substrates such as wood, paper, metals and the like. The presence of the polyamine functionality improves the adhesion of these coatings. The compositions are also useful as components of formulated adhesives wherein the polyamine functional groups provide improved adhesion to the substrates.

It is understood that many compositions in addition to those described are obtainable by the practice of this invention. Various modifications may be made without departing from the scope of the invention as set forth in the claims below.

What is claimed is:

1. A process for preparing an aminated vinyl interpolymer having pendant polyamine groups of the formula

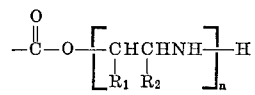

wherein $R_1$ and $R_2$ are independently selected from the group consisting of hydrogen and lower alkyl radicals of 1 to 4 carbon atoms and the average value of $n$ ranges from about 1.5 to about 2.5, said process comprises reacting an inert organic solvent solution of a vinyl carboxylic acid interpolymer containing from about 1 to 20 weight percent of —COOH acid groups with an alkylenimine in such a manner that the temperature of the reaction is at least about 50° C. and does not exceed about 100° C. and conducting the reaction within said temperature range until the residual acid content is less than about 0.25 weight percent;

wherein said alkylenimine is selected from the group consisting of 1,2-alkylenimines and N-(aminoalkyl)-1,2-alkylenimines, and wherein the reactants are employed in the proportions of about 2 to 5 moles of 1,2-alkylenimine per equivalent of carboxylic acid or about 1 to 1.5 moles of the N-(aminoalkyl)-1,2-alkylenimine per equivalent of carboxylic acid.

2. The process of claim 1 wherein said carboxylic acid interpolymer contains from 3 to 12 weight percent of —COOH groups.

3. The process of claim 1 wherein said alkylenimine is ethylenimine or propylenimine.

4. The process of claim 1 wherein said alkylenimine is N-(2-aminoethyl) aziridine or N-(3-aminopropyl) aziridine.

5. The process of claim 1 wherein said solvent consists of zero to 20 weight percent of an alcohol and from 80 to 100 weight percent of an aromatic hydrocarbon.

6. The process of claim 1 wherein said carboxylic acid interpolymer is the polymerization product of an unsaturated carboxylic acid monomer and one or more monomers selected from the group consisting of vinyl aromatic monomers and alkyl esters of unsaturated carboxylic acids wherein the alkyl group contains from 1 to 12 carbon atoms.

7. The process of claim 6 wherein said acid monomer is acrylic acid or methacrylic acid.

8. An aminated vinyl interpolymer prepared according to the process of claim 1.

9. An aminated vinyl interpolymer prepared according to the process of claim 3.

10. The aminated vinyl interpolymer of claim 9 wherein the amido nitrogen content is less than about 10 percent of the total nitrogen content.

11. An aminated vinyl interpolymer prepared according to the process of claim 4.

12. An aminated vinyl interpolymer prepared according to the process of claim 6.

13. The interpolymer of claim 12 wherein the amido nitrogen content is less than about 10 percent of the total nitrogen content.

14. The interpolymer of claim 12 wherein the amido nitrogen content is less than about 6.5%.

References Cited

UNITED STATES PATENTS

| | | | |
|---|---|---|---|
| 3,228,823 | 1/1966 | Usala et al. | 161—186 |
| 3,261,796 | 7/1966 | Simms | 260—29.6 |
| 3,261,797 | 7/1966 | Mcdowell et al. | 260—29.6 |
| 3,280,218 | 10/1966 | Endsley et al. | 260—874 |
| 3,290,416 | 12/1966 | Christenson et al. | 260—901 |
| 3,386,939 | 6/1968 | Mesec | 260—29.3 |

FOREIGN PATENTS 636,350  2/1964  Belgium.

MELVIN GOLDSTEIN, Primary Examiner

U.S. Cl. X.R.

117—132 B; 260—29.6 HN, 33.4 R, 33.6 UA, 80.8, 88.1 P, 88.1 PC, 901